(12) United States Patent
Moriyama et al.

(10) Patent No.: US 7,610,234 B2
(45) Date of Patent: Oct. 27, 2009

(54) CONSTRUCTION BROKERAGE SYSTEM

(76) Inventors: Takashi Moriyama, Hayashi Bldg. 301, Jingumae 3-chome, 42-3, Shibuya-ku, Tokyo 150-0001 (JP); Kiyomi Moriyama, Hayashi Bldg. 301, Jingumae 3-chome, 42-3, Shibuya-ku, Tokyo 150-0001 (JP)

( * ) Notice: Subject to any disclaimer, the term of this patent is extended or adjusted under 35 U.S.C. 154(b) by 1505 days.

(21) Appl. No.: 09/858,503

(22) Filed: May 17, 2001

(65) Prior Publication Data

US 2001/0056355 A1    Dec. 27, 2001

(30) Foreign Application Priority Data

May 24, 2000    (JP)    ............................. 2000-152544

(51) Int. Cl.
   *G06Q 40/00*    (2006.01)
(52) U.S. Cl. .......................................... 705/37; 705/38
(58) Field of Classification Search ..................... 705/1, 705/35, 80, 37–38
See application file for complete search history.

(56) References Cited

U.S. PATENT DOCUMENTS

| | | | | |
|---|---|---|---|---|
| 5,918,207 A | * | 6/1999 | McGovern et al. | 705/1 |
| 5,995,939 A | * | 11/1999 | Berman et al. | 705/3 |
| 6,009,406 A | * | 12/1999 | Nick | 705/10 |
| 6,088,659 A | * | 7/2000 | Kelley et al. | 702/62 |
| 6,470,318 B1 | * | 10/2002 | Coakley | 705/1 |
| 6,594,633 B1 | * | 7/2003 | Broerman | 705/1 |
| 6,633,850 B1 | * | 10/2003 | Gabbard et al. | 705/14 |
| 7,092,892 B1 | * | 8/2006 | Sobalvarro et al. | 705/5 |

\* cited by examiner

*Primary Examiner*—Thu-Thao Havan
(74) *Attorney, Agent, or Firm*—Arent Fox LLP.

(57) ABSTRACT

Customer information including construction commission information from customers who make access through communication lines and/or the Internet is collected and disclosed onto the Internet. Agent information including proposals from agents who have browsed the disclosed customer information is also collected through communication lines and/or the Internet and disclosed to the customers. This makes the information collection between the customers and agents smoother, expands the range of business operations by the agents, and increases the range of selections by the customers for more satisfactory agent selections.

4 Claims, 8 Drawing Sheets

FIG.4

◆ COMPETITION ADVERTISEMENT TABLE ◆

| COMPETITION NUMBER | GENRE | REQUIREMENTS | NAME OF COMPETITION | DEADLINE |
|---|---|---|---|---|
| 002 | | | | |
| 001 | INTERIOR DESIGN ONLY. EXECUTION OF DESIGN WORKS. | INTERIOR DESIGNER, DESIGN OFFICE, INTERIOR FINISHER | N PHARMACY REFURBISHMENT → APPLICATION GUIDELINE DETAILS | 4/10 |

FIG.5

◆ APPLICATION GUIDELINE TABLE ◆

● EACH APPLICATION GUIDELINE IS DESCRIBED IN THIS FORM.

| COMPETITION NUMBER | NAME OF COMPETITION | GENRE | REQUIREMENTS | DEADLINE |
|---|---|---|---|---|
| ADVERTISEMENT | | | | |
| REFERENTIAL DRAWING | | | | |
| REFERENCE | | | | |
| HOW TO APPLY | | | | |
| APPLICATION FEE | | | | |

FIG.6

◆ APPLICATION GUIDELINE DETAILS ◆

| 001 | N PHARMACY REFURBISHMENT | INTERIOR DESIGN ONLY OR EXECUTION OF DESIGN WORKS | INTERIOR DESIGNER, DESIGN OFFICE, INTERIOR FINISHER | 4/10 |
|---|---|---|---|---|
| ADVERTISEMENT | ● INTERIOR DESIGN WANTED: FOR RENOVATING AN APP. 66-m² SECOND-STORY ROOM OF A BUILDING NEAR SHIBUYA STATION, JR YAMANOTE LINE, IN SHIBUYA-KU, TOKYO.<br>● THE APP. 66m² MUST INCLUDE AN APP. 23m² OF DISPENSARY (WITH A SMALL SINK) AND APP. 16m² OF STAFF ROOM AND WAITING ROOM (APP. 10-PERSON 15-min. WAITING EXPECTED). NO REST ROOM IS REQUIRED SINCE THERE IS A SHARED ONE ALREADY.<br>● PROPOSALS OF DESIGN & CONSTRUCTION AND OF DESIGN ALONE, BOTH ARE ACCEPTABLE<br>● FOR INFORMATION, THE OWNER IS A PHARMACIST IN HIS EARLY THIRTIES, AND IS PLANNING FOR FRANCHISING. IT IS THUS DESIRED THAT CONSIDERATION IS GIVEN TO DESIGN HOMOGENEITY BEYOND THE PRESENT PROPERTY.<br>● EARLIEST CONSTRUCTION IS DESIRED AFTER THE TENANT CONTRACTION, SO THAT WE CAN HAVE INSPECTIONS BY THE PUBLIC HEALTH DEPARTMENT BY THE END OF APRIL. ||||
| REFERENTIAL DRAWING | DRAWING ||||
| REFERENCE | WE CAN E-MAIL OR FAX DETAILED DRAWINGS TO APPLICANTS. CONTACT OUR PERSONNEL IN CHARGE OF COMPETITION. ||||
| | HANDBOOK TO OPENING PHARMACY, ETC. ||||
| HOW TO APPLY | A FLOOR PLAN, FINISHING CHART, OR THE LIKE FOR USE IN ESTIMATION, OR ESTIMATION SHEETS ||||
| APPLICATION FEE | ＊＊＊YEN ||||

FIG.7

WEB CONSTRUCTION INC.

| CHIEF BUSINESS | INTEGRATED CONSTRUCTOR, HOUSE RENOVATOR |
|---|---|
| LICENSE NUMBER | BUILDING TRADE LICENSE NO.**** |
| SELLING POINT | LOCAL HOUSE BUILDER, SPECIALISED FOR HEALTH AND NATURAL MATERIALS |
| ADDRESS | 3-**-CHOME, JINGUMAE, SHIBUYA - KU, TOKYO, 151 - 0001 |
| TEL | 03-54**-24** |
| FAX | 03-54**-24** |
| URL | http://www.kenntiku-gyousya.** |
| E - MAIL ADDRESS | kenntiku@kennsetu. |

| BRANCH / SALES OFFICE / SHOW HOUSE | ADDRESS | TEL | FAX |
|---|---|---|---|
| KANSAI BRANCH | *-CHOME, -KU, OSAKA | 06-65-65 | 06-65*-65** |
| TOHOKU BRANCH | *-CHOME, -KU, SENDAI - SHI | 02-21-21 | 02-21-21** |

FIG.8

● CHECK APPLICABLE CATEGORY

| ARCHITECT | STRUCTURAL ENGINEER | EQUIPMENT ENGINEER | LANDSCAPE GARDENER / LANDSCAPIST |
|---|---|---|---|
| INTERIOR COORDINATOR | KITCHEN COORDINATOR | CONSTRUCTOR & RENOVATOR COMPANY | BUILDING SUPERINTENDENT / MAINTENANCE COMPANY |
| CONSTRUCT MANAGER | REAL ESTATE APPRAISER | FINANCIAL PLANNER | INTERIOR SHOP & FURNITURE CREATOR |
| GARDEN CENTER | CAD / COMPUTER SOFTWARE | SCHOOL | HOUSE MAKER |
| CONSTRUCTION MATERIAL SUPPLIER | FURNITURE MAKER | HOME APPLIANCE & EQUIPMENT MAKER | OFFICIAL ORGANIZATION |

FIG.9

- MARK CHECK BOXES IN THE TABLE BELOW FOR MULTIPLE LINES OF BUSINESS.
- INCLUDE PRODUCT NAMES IN THE TABLE BELOW FOR PUBLICATION OF MORE THAN ONE CONSTRUCTION MATERIAL / PRODUCT / NEW PRODUCT.

| | | CHECK | PRODUCT NAME |
|---|---|---|---|
| CONSTRUCTION MATERIAL | ROOFING (TILES, METAL ROOFING, SPECIAL MATERIALS) | | |
| | WALL FACING (PLASTERING, PAINTS, WOODEN, OTHERS) | | |
| | ⋮ | | |
| | ⋮ | | |
| | OTHERS (ADHESIVES, TOOLS, HEAT INSULATORS, FURRING) | | |
| | EXTERIORS (GARAGES, GATES, FENCES, POSTS, PAVING) | | |
| INTERIORS | FURNITURE (TABLES, CHAIRS, CABINETS, BEDS, ETC.) | | |
| | STORAGE (CURTAINS, WALL PAPER, CARPETS, CUSHIONS, ETC.) | | |
| | GARDENING (DECKS, TERRACES, PLANTING) | | |
| | FABRIC (HOOKS, RAILS, SHELVES / CLOSETS, ETC.) | | |
| | JAPANESE (SHOJI, FUSUMA, LATTICES, TOKONOMA, ETC.) | | |
| HOME APPLIANCE & EQUIPMENT | KITCHEN (SYSTEM KITCHENS, FAUCETS, RANGES, FANS) | | |
| | BATHROOM (BOWLS, TUBS, FAUCETS, HOT WATER SUPPLY, SAUNAS) | | |
| | ⋮ | | |
| | ⋮ | | |
| | OTHERS (SOLAR EQUIPMENT, ELEVATORS, SECURITY SYSTEMS, ETC.) | | |

CONSTRUCTION BROKERAGE SYSTEM

BACKGROUND OF THE INVENTION

1. Field of the Invention

The present invention relates to a construction brokerage system for use in customer/agent information collection, disclosure, bidding, proposal audition/product information search, product purchase, specialist search/selection/commission, and so forth, the system being suited to intermediating between customers who plan to have a building newly built, extended, or rebuilt, and construction agents/construction-related agents (referred to simply as agents) through the Internet.

2. Prior Art

When customers plan to have a building newly built, extended, rebuilt, or renovated, or to have interior renovations, kitchen renovations, and so on, or when they plan to commission construction-related budgeting, financing consultation, purchase of real estate, interior design, construction design, selection of contractors, construction estimation, technical inspection, and so on, they have heretofore had only a limited range of contractor consultation and selection because of customers' domiciles and communicational, transportational, temporal, and other constraints. Moreover, contractors in an identical sector from whom proposals can be obtained within a certain period of time for the sake of comparative examinations have also been limited in number.

Meanwhile, due to office domiciles and communicational, transportational, temporal, and other constraints, agents who plan business operations on customers have also been limited in the range of sales contacts and in the number of scenes for accurately gathering customer needs to make proposals. In addition, the agents have had no choice but to simply disclose their own proposal presentations to an indefinite number of customers. That is, they have had a limited number of opportunities to demonstrate, through customer communication, their adaptability to the customer needs in comparison with other agents.

SUMMARY OF THE INVENTION

The prevent invention has been achieved to solve the conventional problems mentioned above. It is thus an object of the present invention to make the information collection between customers and agents smoother, expand the range of business operations by the agents, and increase the range of selections by the customers for more satisfactory agent selections.

The foregoing object of the present invention has been achieved by the provision of a construction brokerage system comprising: customer information collecting means for collecting customer information including construction commission information from a customer who makes access through a communication line or the Internet; customer information disclosing means for disclosing the customer information onto the Internet; agent information collecting means for collecting agent information through a communication line or the Internet, the agent information including a proposal from an agent who has browsed the customer information disclosed; and agent information disclosing means for disclosing the agent information collected to the customer through a communication line or the Internet.

Moreover, the customer information collecting means and the agent information collecting means comprise: a guiding unit for sending a guide message in response to the access from the customer and agent through a communication line or the Internet; a receiving unit for receiving communications or e-mails from the customer and agent; a data collecting unit for collecting the customer information and agent information from among responses and/or the contents of communications from the customer and agent; and a database for storing the collected information in a predetermined format. The customer information disclosing means and the agent information disclosing means comprise: a data summarizing and analyzing unit for reading the customer information and agent information stored in the database at predetermined time intervals for summarization and analysis; an information disclosing unit for disclosing the summarized and analyzed customer and agent information through a communication line or the Internet; and an information transmitting unit for transmitting the summarized and analyzed customer and agent information through a communication line or the Internet. This realizes the aforementioned construction brokerage system in a relatively simple configuration.

Furthermore, the customer information collecting means and the agent information collecting means include a data collating unit for collating data received from the customer and agent with existing data to check for past inquiries and/or applications, as well as professional qualifications. This allows an precise check as to whether or not the agents and others have professional qualifications.

In the present invention, customers who plan to have a building newly built, extended, rebuilt, or renovated, or to have interior renovations, kitchen renovations, and so on, or who plan to commission construction-related budgeting, financing consultation, purchase of real estate, interior design, construction design, selection of contractors, construction estimation, technical inspection, and so on, make a contractor search and/or disclose their commission request information through communication lines and/or the Internet, in such a form as an online audition or competition. Besides, proposals and the like from contractor candidates are disclosed also through the communication lines and/or the Internet, in such a form as online presentations. Therefore, the customers can select information of more contractors while the agents can grasp customer needs more accurately to enhance the range of their presentations. This makes the information collection between the customers and agents smoother, expands the range of business operations by the agents, and increase the range of selections by the customers for more satisfactory agent selections. As a result, it is possible to collect and select information and proposals of products, services, and ideas from a greater number of contractors, to determine contractors who are more suited to the requests. Besides, agents who wish to grasp these customer needs upon business operations for each project can conduct the information collection, bidding, and manifestation of participation into the audition and so on, to make project proposals more suitable for the customer requests.

According to the present invention, the following excellent effects can be obtained, aside from that it is possible to determine contractors such as construction specialists through auditions/competitions based on customer requests.

The customers can obtain information about construction-related agents and products anytime on a 24-hour basis. They can also solicit a wide range of proposals and product information that better fit their requests. Furthermore, they can select construction specialists and products that better fit their requests.

Meanwhile, construction specialists can directly respond to customer requests. Knowing the customer requests in detail, they can also achieve the development of products and the promotion of technologies which are backed by data.

Besides, the upfront presence of commission requesters allows well-targeted business operations. Moreover, the proposals to the customers can be disclosed widely with an effect of public relations for other customers. The disclosed customer information can be analyzed to develop products in anticipation of consumer behavior. Furthermore, the collected customer information and construction specialist information are stored into the database, and thus can be utilized for a long-range strategy on advertisement and business operations.

Moreover, the customers can place orders with different construction-work contractors who better meet their requests. Besides, the customers can commission other agents to manage decisions for construction works that better meet their requests. They can also commission construction specialists to inspect information as to the construction works that better meet their requests. They can also hold bidding for commissions that better meet their requests, to make a judgment on cost. Moreover, construction specialists themselves can solicit partners who better fit their needs. The customers can also purchase materials that better meet their requests. Even in remote locations, the customers can widely solicit excellent proposals that better meet their requests, to commission the construction specialists of the excellent proposals.

Meanwhile, the construction specialists can make more effective business operations in a short time since the exchange of information through the communication lines and/or the Internet allows the disclosure of the information in a short time. Even in remote locations, they can make effective proposals and business operations that better meet customer requests, to increase the possibility of obtaining commission from the customers.

BRIEF DESCRIPTION OF THE DRAWINGS

The preferred embodiments will be described with reference to the drawings, wherein like embodiments have been noted throughout the figures with like reference numerals and wherein:

FIG. 4 is a diagram showing an example of a competition advertisement table of the customer need information employed in the above-mentioned embodiment;

FIG. 5 is a diagram showing an example of an application guideline table;

FIG. 6 is a diagram showing a concrete example of application guidelines;

FIG. 7 is a diagram showing an example of an agent overview;

FIG. 8 is a diagram showing an example of agent categories; and

FIG. 9 is a diagram showing an example of lines of business.

DESCRIPTION OF THE PREFERRED EMBODIMENT

Hereinafter, an embodiment of the present invention will be described in detail with reference to the drawings.

Figure 1:
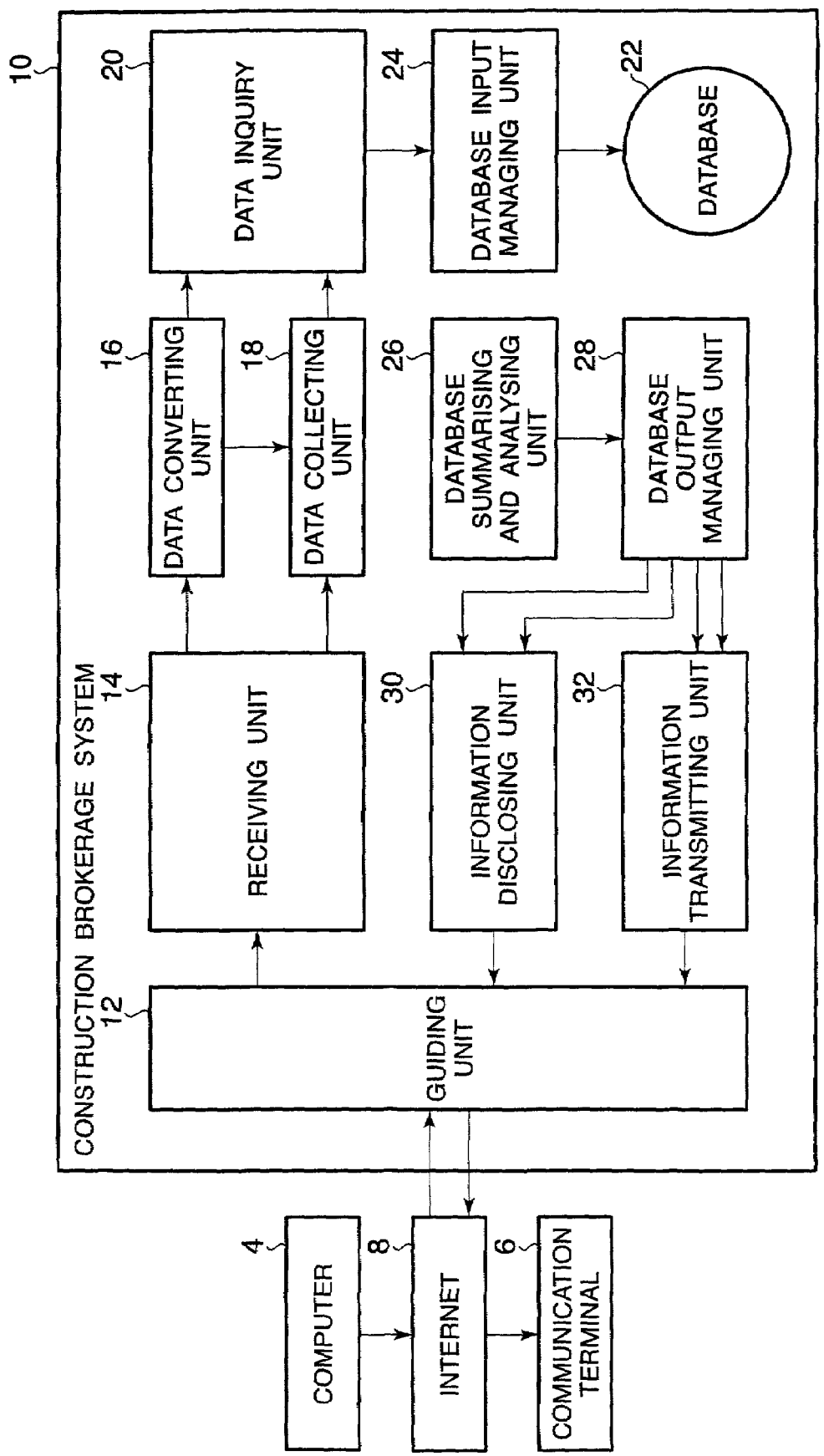
FIG. 1 is a block diagram showing the configuration of an embodiment of the construction brokerage system according to the present invention.

FIG. 1 shows an embodiment of a construction brokerage system 10 according to the present invention, which is capable of customer/agent information collection, disclosure, bidding, proposal audition/product information search, product purchase, specialist search/selection/commission, and so on.

This embodiment includes a guiding unit 12, a receiving unit 14, a data converting unit 16, a data collecting unit 18, a data inquiry unit 20, a database 22, a database input managing unit 24, a database summarizing and analyzing unit 26, a database output managing unit 28, an information disclosing unit 30, and an information transmitting unit 32.

The guiding unit 12 sends guide messages and the like to customers and agents who make access from a computer 4 or a communication terminal 6 through communication lines and/or the Internet 8.

The receiving unit 14 receives communications and/or e-mails from the customers and agents.

The data converting unit 16 converts the requests/replies from the customers, the replies from the agents, and the like into text or other forms.

The data collecting unit 18 collects customer information and agent information based on the contents of the e-mails and the results of questionnaires.

The data inquiry unit 20 collates the data received from the customers/agents with existing data.

The database input managing unit 24 manages data input to the database 22 so that the information collected by the data collecting unit 18 is stored into the database 22 in a predetermined format.

The database summarizing and analyzing unit 26 reads the customer and agent information stored in the database 22 at e.g. predetermined time intervals, to summarize and analyze the same under predetermined conditions.

The database output managing unit 28 manages data retrieval from the database 22 so that the customer and agent information summarized and analyzed by the database summarizing and analyzing unit 26 is retrieved from the database 22.

The information disclosing unit 30 discloses the retrieved customer and agent information through the communication lines and/or the Internet 8.

The information transmitting unit 32 automatically transmits the retrieved customer and agent information to specified locations through the communication lines and/or the Internet 8.

Figure 2:
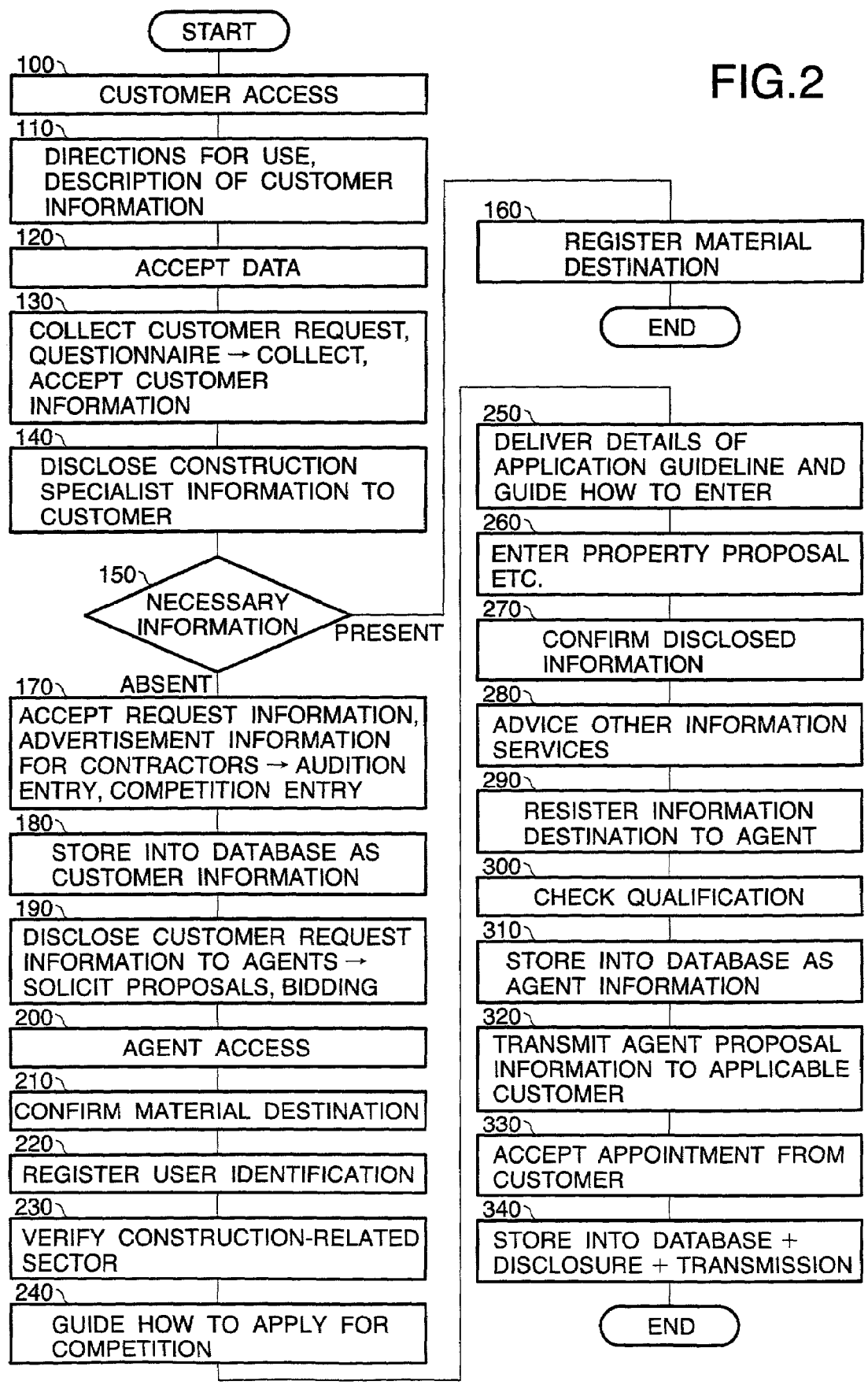
FIG. 2 is a flowchart for outlining the operation of the embodiment mentioned above.
Figure 3:
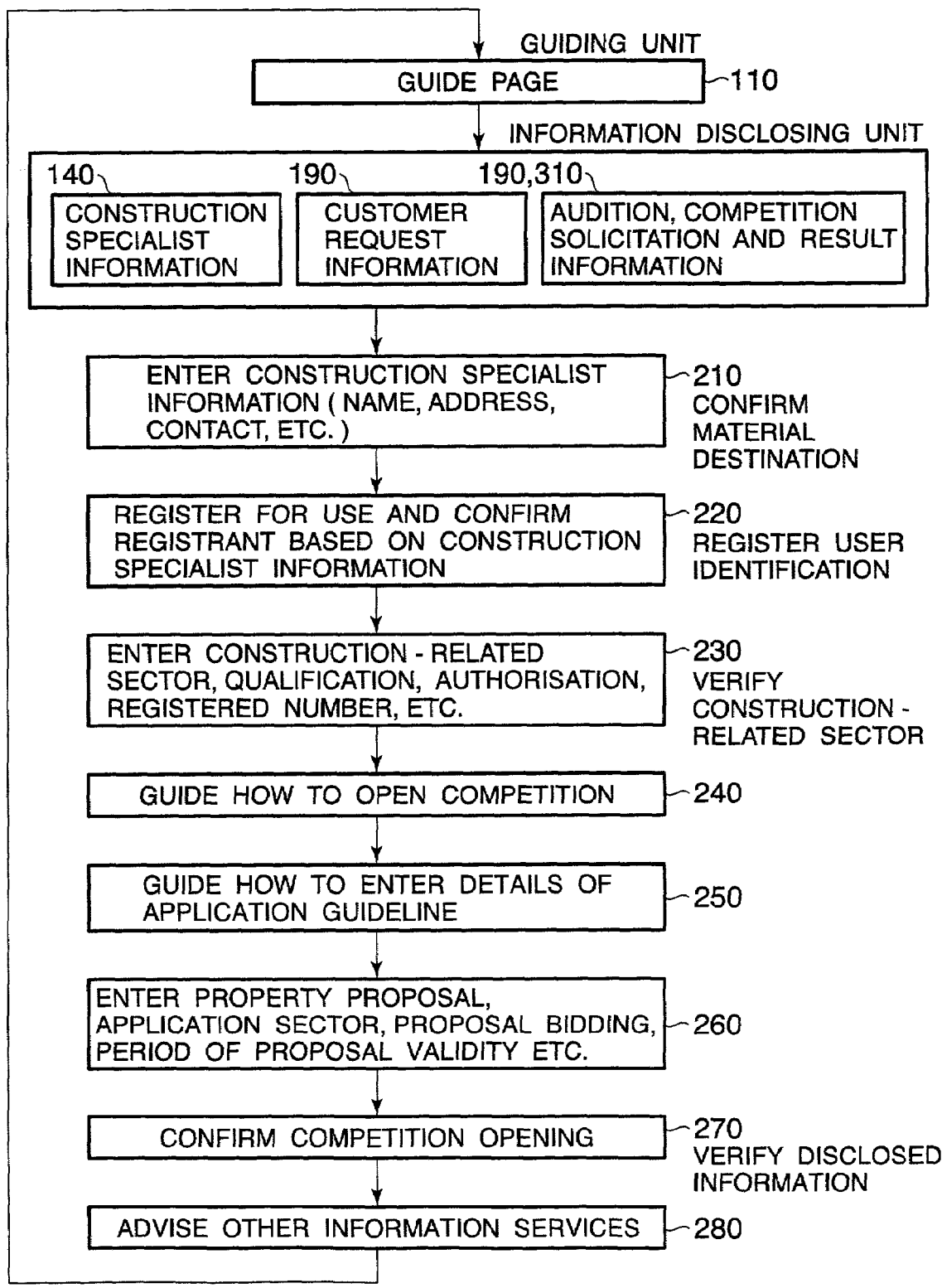
FIG. 3 is a flowchart for detailing the essential part of the same.

Hereinafter, the operation of the present embodiment will be described with reference to FIG. 2 (whole) and FIG. 3 (details of the essential part).

To operate the construction brokerage system 10 described above, newspaper ads and magazine ads are first issued with the phone number, Internet domain, and other information of the present system printed in the ads for the sake of material requests and inquiries. This allows customers who have seen the advertisements to make access freely to the present system through the communication lines and/or the Internet 8. For the sake of clear explanation, description here will be given of the case where a customer who has seen the newspaper ads makes communications through the communication lines and/or the Internet 8.

Now, the customer sees the newspaper ad, and makes access to the present system through a communication line or the Internet 8 (step 100). The guiding unit 12 uses, for example, a guide page (FIG. 3) to provide the customer with directions for use and descriptions as to customer information (step 110). In the meantime, the data collecting unit 18 accepts customer information through the receiving unit 14 (step 120). Through successive guidance of the guiding unit 12 and the information disclosing unit 30, customer requests are collected, and questionnaires and the like are conducted to collect/accept the customer information being communicated (step 130).

That is, upon the arrival of a call on the communication line from the customer, the guiding unit 12 and the information disclosing unit 30 search for the customer-required information and/or provide guidance as to the reception of requests, and if necessary, disclose construction specialist information including presentations by construction specialists and product information (step 140). If there is found the required information (step 150), the processing moves to the registration process for registering the customer's material destination address, the user identification, and the like (step 160).

On the other hand, if the customer-required information or -requested contractor is not found in the information disclosing unit 30, or if the customer wishes to select other dealers/contractors, the guiding unit 12 executes the procedures for entering and transmitting request information and/or advertisement information for contractors, followed by the audition entry/competition entry (step 170). This customer request information is collected to the data collecting unit 18. The customer request information collected is sent to the database input managing unit 24. It is summarized into such a data format as shown in FIG. 4 (an example of a competition advertisement table), FIG. 5 (an example of an application guideline table), and FIG. 6 (a concrete example of the same), before stored into a predetermined location on the database 22 as customer request information (step 180).

Then, the information disclosing unit 30 discloses this customer request information to construction specialists, suppliers, dealers and others, thereby soliciting proposals and bidding widely under predetermined conditions, periods, and so on (step 190).

Construction specialists browse the disclosed customer request information and audition/competition information, and make access through communication lines and/or the Internet 8 (step 200). The guiding unit 12 and the information disclosing unit 30 confirm material destinations through the entry of construction specialist information (name, address, contacts, and so on) (step 210), register user identifications through the registration for use and the confirmation of the registered names based on the construction specialist information (step 220), and verify the construction-related sectors through the entry of construction-related sectors, qualifications, authorization, registered numbers, and so forth (step 230). Then, the guiding unit 12 and the information disclosing unit 30 provide the construction specialists with guidance as to the retrieval of customer-soliciting information and the reception of proposals. If necessary, there follow the steps of guiding how to open a competition (step 240), guiding how to enter the details for application (step 250), and entering property proposals, application track records, proposal bidding, periods of proposal validity, and so on (step 260). Then, the details of the customer information and the information of the predetermined conditions, periods, and the like are disclosed. The disclosed information is verified through the confirmation of the competition opening (step 270). If necessary, other information services are advised (step 280) before the processing moves to the process for registering the information notification addresses and the like of the construction specialists (step 290).

Here, to check the national licenses, registered licenses, and the like of the construction specialists, the receiving unit 14 carries out the entry of qualifications, registration information, and so on. The data inquiry unit 20 checks the classification and registration of the construction specialists (step 300).

The database input managing unit 24 summarizes the checked data into a data format as shown in FIG. 7 (an example of an agent overview), FIG. 8 (an example of agent categories), or FIG. 9 (an example of lines of business), before stored into a predetermined location on the database 22 as agent information (step 310).

Through such a series of procedures, the construction specialists make proposals for the customer requests, in a predetermined format guided by the information disclosing unit 30. The proposal information is transmitted/delivered to the customer who holds the audition or competition (step 320). The customer selects/determines the necessary information and contractor(s) from among the proposals collected, and returns the result through the communication lines and/or the Internet 8. The returned information is accepted by the receiving unit 14 (step 330). It is summarized into a predetermined data format by the database input managing unit 24, and stored into a predetermined location on the database 22 (step 340). The result of this audition/competition is disclosed by the information disclosing unit 30. If requested, the result is also transmitted to the customer and/or the construction specialists.

In this way, the present system continuously accepts communication from customers on a 24-hours basis, to collect the information of the customers. Then, at every predetermined time, all the customer information collected is summarized and subjected to contents analysis, and the results of the summarization and analysis are sent to specified locations. Meanwhile, on a 24-hour basis without a break, customer requests are collected and disclosed to accept construction specialists applying for the requests; proposals are accepted in the forms of audition, competition, bidding, and the like, and the contents thereof are collected. Within a predetermined period of time, all the application and proposal information is transmitted/delivered to the customers soliciting construction specialists and to specified locations.

In this way, the customers can easily search, select, and determine contractors through the communication lines, the Internet, and so on. Besides, the range and scale of selection, which have been limited heretofore, can be increased dramatically. Moreover, commissions to construction specialists can be tailored yet closer to the requests, and the contents of the commissions can be subjected to comparative examinations. This leads to proposals of higher quality and products of a wider range of selection. On the other hand, for construction specialists, agents, and suppliers, it is possible to know the details of the customer requests to reflect the same to product development. Besides, it is possible to target prospective clients in advance for effective business operations. Moreover, the provision of a setting for comparing construction specialists' skills prepares the way for further enhancement of their skills. Furthermore, since the audition and competition results are disclosed, customer requests can be grasped better for immediate reflection to future advertisements and business operations. This allows delicate product development, business operations, and enhancement of skills.

The applications of the present system include commissions for the following: budgeting, financing, purchase of land, purchase of secondhand houses, purchase of new properties, purchase of structural materials, purchase of finishing materials, purchase of imported materials, drawing and design of new properties, drawing and design of extended/rebuilt properties, drawing and design of renovated properties, drawing and design of furniture and interiors, drawing and design of gardening, drawing and design of lighting, drawing and design of coloring, drawing and design of structures, drawing and design of equipment, construction of new properties, construction of extended/rebuilt properties, construction of renovated properties, execution of furniture and interior works, execution of gardening works, selection of healthy house systems and materials, execution of lighting works, execution of painter's works, execution of structural works, execution of equipment works, construction management, and judgment of construction estimation.

Note that the above-mentioned service details are one example. In various other sectors and categories of construction business, the information collection and agent auditions/competitions can be conducted according to conditions and based on requested commissions.

Moreover, the present system is also applicable to the cases of selling products proposed by individual sectors, through mail orders via the communication lines and/or the Internet.

It should be apparent to those skilled in the art that the above-described embodiments are merely illustrative which represent the application of the principles of the present invention. Numerous and varied other arrangements can be readily devised by those skilled in the art without departing from the spirit and the scope of the invention.

What is claimed is:

1. A construction brokerage system comprising:
   customer request inputting means for inputting one or more customer requests from one or more customers who make access through a communication line or the Internet;
   customer request collecting means for collecting the one or more customer requests from the one or more customers, wherein the one or more customer requests is stored in a database in a predetermined format;
   customer request disclosing means for disclosing said one or more customer requests to the Internet in a form of an online audition or competition;
   customer proposal inputting means for inputting constructor proposals through a communication line or the Internet, said constructor proposals including one or more proposals from one or more constructors who has browsed said one or more customer requests disclosed, wherein the proposals varies based on the one or more customer requests;
   constructor proposal collecting means for collecting the constructor proposals through the communication line or the Internet, wherein the constructor proposals are stored in a database and is retrievable for different customers; and
   constructor proposal disclosing means for disclosing said constructor proposals collected to an appropriate one or more of said customers for deciding a constructor by transmitting said constructor proposals to said appropriate one or more of said customers through a communication line or the Internet to be viewed on a computer or communications terminal by said appropriate one or more of said customers, wherein the disclosed proposal is in a form of online presentation.

2. The construction brokerage system according to claim 1, wherein:
   said customer request collecting means and said constructor proposal collecting means comprise a guiding unit sending a guide message in response to the access from said one or more customers and said one or more constructors through a communication line or the Internet, a receiving unit receiving communications or e-mails from said one or more customers and said one or more constructors, a data collecting unit collecting said customer requests and constructor proposals from among responses and/or the contents of communications from said one or more customers and said one or more constructors, and a database storing collected information in a predetermined format; and
   said customer request disclosing means and said constructor proposal disclosing means comprise a data summarizing and analyzing unit reading said one or more customer requests and constructor proposals stored in said database at predetermined time intervals for summarization and analysis, an information disclosing unit disclosing said summarized and analyzed customer and constructor information through a communication line or the Internet, and an information transmitting unit transmitting said summarized and analyzed customer and constructor information through a communication line or the Internet to at least one of said one or more customers and said one or more constructors.

3. The construction brokerage system according to claim 2, wherein
   said customer request collecting means and said constructor proposal collecting means include a data collating unit collating data received from said one or more customers and constructors with existing data to check for past inquiries and/or applications, as well as professional qualifications.

4. The construction brokerage system according to claim 1, further comprising a database summarizing and analyzing means for reading the one or more customer request and the constructor proposals stored in the database in a predetermined time intervals to summarize and analyze the one or more customer request and the constructor proposals under predetermined conditions.

* * * * *